United States Patent [19]

Pope

[11] Patent Number: 4,578,018
[45] Date of Patent: Mar. 25, 1986

[54] ROTOR THRUST BALANCING

[75] Inventor: Adam N. Pope, Cincinnati, Ohio

[73] Assignee: General Electric Company, Cincinnati, Ohio

[21] Appl. No.: 752,498

[22] Filed: Jul. 8, 1985

Related U.S. Application Data

[63] Continuation of Ser. No. 506,141, Jun. 20, 1983, abandoned.

[51] Int. Cl.[4] ............................................. F01D 3/04
[52] U.S. Cl. .................................... 415/14; 415/104; 415/107; 415/132; 384/420; 60/39.31
[58] Field of Search ................ 415/14, 131, 104, 107, 415/132, 133, 170 R, 168, 170 A, 173 R; 308/230, 233; 384/99, 420, 517, 519, 556, 616; 60/39.31

[56] References Cited

U.S. PATENT DOCUMENTS

| | | | |
|---|---|---|---|
| 553,932 | 2/1896 | Parsons | 415/168 X |
| 971,849 | 10/1910 | Krogh | 415/105 X |
| 2,866,620 | 12/1958 | Williams | 415/105 |
| 2,993,448 | 7/1961 | Garey | 415/132 X |
| 3,531,223 | 9/1970 | Daltry et al. | 417/409 |
| 4,159,888 | 7/1979 | Thompson | 415/105 |
| 4,268,220 | 5/1981 | Malott | 415/104 |
| 4,306,834 | 12/1981 | Lee | 415/116 |
| 4,309,144 | 1/1982 | Eggmann et al. | 415/105 |

FOREIGN PATENT DOCUMENTS

| | | | |
|---|---|---|---|
| 60717 | 5/1980 | Japan | 384/420 |
| 147804 | 7/1962 | U.S.S.R. | 384/307 |

Primary Examiner—Robert E. Garrett
Assistant Examiner—Joseph M. Pitko
Attorney, Agent, or Firm—Douglas S. Foote; Derek P. Lawrence

[57] ABSTRACT

An assembly is disclosed for automatically balancing thrust on the rotor of a gas turbine engine. An annular chamber axially positioned relative to the rotor is adapted to receive pressurized hydraulic fluid and apply it to the rotor. The force thereby applied to the rotor is regulated by sensing changes in axial rotor thrust and delivering hydraulic fluid to the chamber at a pressure sufficient to balance axial forces acting on the rotor.

5 Claims, 2 Drawing Figures

ROTOR THRUST BALANCING

This is a continuation of application Ser. No. 506,141, filed June 20, 1983, now abandoned.

This invention relates to gas turbine engines and, more particularly, to means for compensating for variable axial thrust produced upon a rotor of such engines.

BACKGROUND OF THE INVENTION

Gas turbine engines include generally a rotor assembly and stationary mounting. The rotor assembly includes a number of components which rotate as a unit. For example, such components include a central shaft, shaft cones, compressor blades and disks, turbine buckets and wheels, and dynamic air seals. Each component is reacted upon by static and/or dynamic axial pressure forces. The vector sum of these forces is a net axial force or thrust generally in either the forward or aft direction. This net thrust tends to separate the rotor assembly from the stationary mounting.

In order to absorb this load without interfering with the free rotation of the rotor assembly a thrust bearing is employed. Typically, such thrust bearings are ball bearings encased within a thrust bearing housing. The load on thrust bearings varies as the pressures on the various rotor parts change. This problem is particularly acute in variable cycle engines where rotor thrust pressures can fluctuate widely. Net rotor axial thrust in the range of 0 to 20,000 pounds (force) is not uncommon. Moreover, under certain conditions net rotor axial thrust may change direction, a condition known as "cross-over." If net axial thrust is excessive, undue wearing and premature failure of thrust bearings may occur. If cross-over occurs, radial movement of the rotor may adversely affect seal clearances resulting in deterioration of engine operating characteristics.

In the past, one means to compensate for high net axial thrust has been to create regions in the engine where air pressure is used to balance net rotor thrust pressure. One such region exists behind the stator exit at compressor discharge. At the junction where high pressure air leaves the compressor and enters into the combustion chamber a seal is provided to reduce air lost. This seal may be located radially as desired. The region between the gas flowpath and the seal location is axially bounded by the forward positioned rotor and aft positioned stationary support structure. High pressure in this region, therefore, provides only forward thrust on the rotor. This region is known as a free balance area because the radial position of the seal determines the area of rotor surface on which this high pressure may act. For instance, decreasing the diameter of this seal increases rotor area thereby increasing forward rotor thrust.

In the past, designers have used the free balance area to balance rotor thrust so as to reduce the load on the ball thrust bearing. Two problems exist with this form of rotor balancing. First, this fixes the diameter of the compressor discharge seal to a predetermined value. Ideally, the diameter of this seal should be as small as possible so as to minimize the leakage around the seal. Such leakage is undesirable since it robs the system of high pressure air thereby decreasing engine efficiency. Second, a fixed free balance area is unable to compensate for variations in net rotor thrust.

OBJECTS OF THE INVENTION

It is an object of the present invention to provide a new and improved means of balancing rotor thrust.

It is another object of the present invention to provide a new and improved means of automatically balancing rotor thrust.

It is a further object of the present invention to reduce the diameter of the compressor discharge air seal and/or any other seals otherwise critical to thrust balance within a gas turbine engine.

It is still a further object of the present invention to provide means for preventing cross-over in a gas turbine engine.

It is yet another object of the present invention to improve the efficiency of gas turbine engines by reducing gas leakage through the compressor discharge seal and/or any other seal otherwise critical to thrust balance.

SUMMARY OF THE INVENTION

A rotor thrust balancing assembly for a gas turbine engine is disclosed. In one form of the present invention, the rotor thrust balancing assembly comprises a rotor and means for applying a variable pressure hydraulic fluid to the rotor. In this manner the hydraulic fluid exerts force on the rotor in an axial direction.

DETAILED DESCRIPTION OF THE INVENTION

Figure 1:
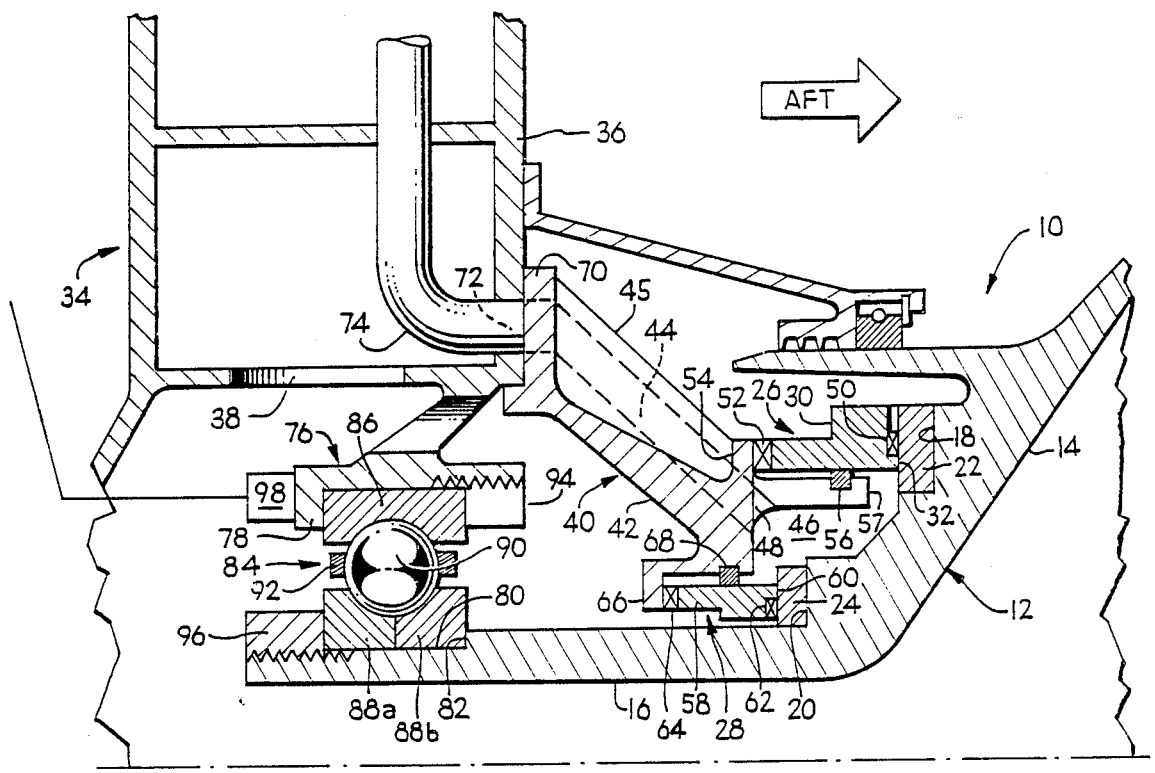
FIG. 1 is a sectional view of a gas turbine engine rotor thrust balancing assembly of the present invention.

FIG. 1 illustrates one embodiment of a rotor thrust balancing assembly for a gas turbine engine in accordance with the present invention. Generally, rotor thrust balancing assembly 10 includes engine shaft rotor 12, thrust bearing 84 and hydraulic thrust assembly 40. More specifically, rotor 12 comprises a generally outwardly directed shaft segment 14 connected to an axially directed shaft segment 16. Shaft segment 14 includes forward facing annular radially outer peripheral shoulder 18 and forward facing annular radially inner peripheral shoulder 20. Ring-shaped races 22 and 24 abut shoulders 18 and 20 respectively and rotate therewith. Races 22 and 24 are in sliding or fluid film contact with ring-shaped hydraulic fluid seal assemblies 26 and 28.

Positioned axially forward of shaft segment 14 are engine frame members 34. Each member 34 includes a radially disposed aft support panel 36, and an axially disposed lower support platform 38 connected therewith. Attached to aft panels 36 and extending generally inward and aft to shaft segment 14 is hydraulic thrust assembly 40. Thrust assembly 40 includes a non-rotating member 42 providing a forward wall and support, hydraulic fluid seal assemblies 26 and 28 and supply duct 44 with outer duct wall 45. Non-rotating member 42 and rotor 12 are positioned so as to form an annular pressure chamber 46. Chamber 46 is coaxial with the rotational axis of the rotor and has a forward opening 48 leading into supply passage 44.

Seal assembly 26 includes primary seal 30 with integral sealing dam 32. Sealing dam 32 is aft protruding and located in rotating sealing relationship with race 22 and adapted to provide an outer radial seal for hydraulic fluid within pressure chamber 46. Positioned aft and integral with seal 30 are hydrodynamic, hydrostatic, or hybrid bearings 50. Bearings 50 are positioned between seal 30 and race 22. Spring 52 is positioned betwen seal 30 and outer flange 54 of non-rotating member 42 and provides axial tension to close seal 30 against race 22 when no pressure force exists. A secondary ring seal 56 in sliding contact with a radially inner surface of seal 30 mates with an outer groove in shoulder portion 57 of non-rotating member 42. Seal 30, sealing dam 32, and ring seal 56 cooperate with non-rotating member 42 and shaft segment 14 to provide a radially outer seal for pressure chamber 46.

A radially inner seal for pressure chamber 46 between non-rotating member 42 and shaft segment 14 is provided by seal assembly 28. Seal assembly 28 includes primary seal 58 with aft protruding integral sealing dam 60. Sealing dam 60 is located in rotating sealing relationship with race 24 and adapted to provide an inner radial seal for hydraulic fluid within pressure chamber 46. Positioned aft and integral with seal 58 are hydrostatic, hydrodynamic or hybrid bearings 62. Bearings 62 are positioned between seal 58 and race 24. Spring 64 is positioned between seal 58 and inner flange 66 of non-rotating member 42 and provides axial tension to close seal 58 against race 24 when no pressure force exists. A secondary ring seal 68 in sliding contact with a radially outer surface of seal 58 mates with a circumferentially inner groove on non-rotating member 42. Seal 58, sealing dam 60, and ring seal 68 cooperate with non-rotating member 42 and shaft segment 14 to provide a radially inner seal for cavity 46.

Non-rotating member 42 has an integral flange portion 70 which is rigidly fastened to aft support panel 36 by fastening means, not shown. Outer duct wall 45 is attached to one support panel 36 in such a manner that an aperture 72 through panel 36 mates with passage 44 of thrust assembly 40. A feed tube 74 is coupled with a forward end of aperture 72 so as to form a substantially uninterrupted flowpath for hydraulic fluid between tube 74, supply passage 44 and chamber 46.

Connected with lower support platform 38 is cylindrically shaped thrust bearing housing 76 with forward flange portion 78. Coaxial with housing 76 is an outer recess 80 in shaft segment 16 with forward facing wall portion 82. Housing 76 and recess 80 are adapted to mate with axial thrust bearing 84. Bearing 84 includes outer race 86 and split section inner race 88a and 88b, both in rolling contact with ball bearings 90. Ball bearings 90 are spaced from each other by cage 92. Bearing 84 is held axially by flange portion 78 and circular nut 94 and by wall portion 82 and circular nut 96.

Figure 2:
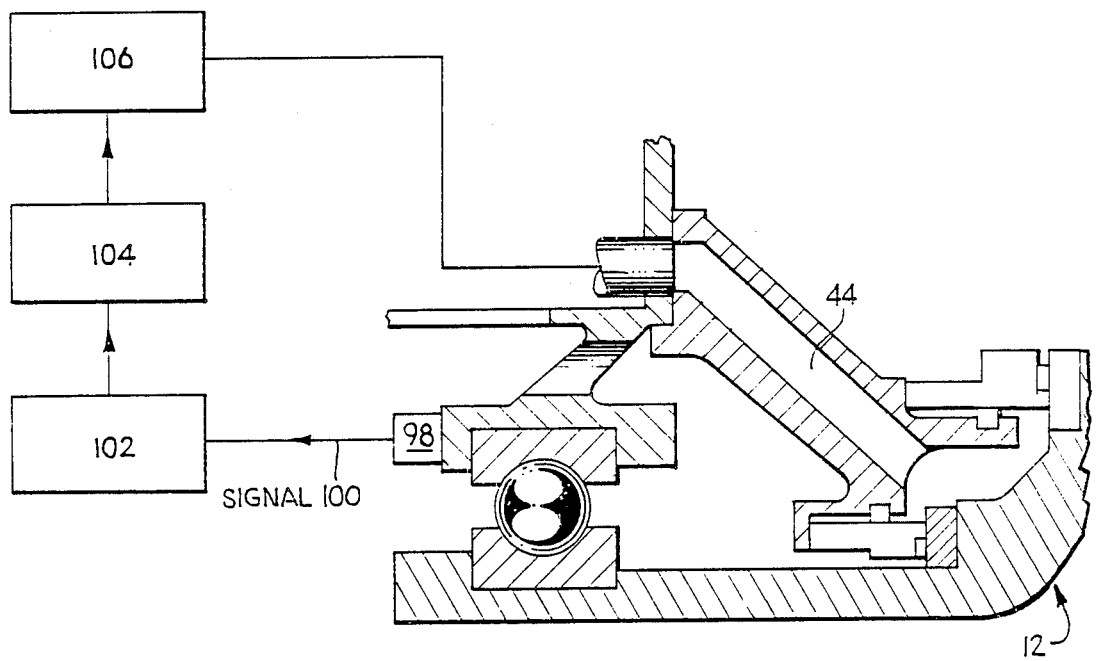
FIG. 2 is a schematic view of a hydraulic rotor thrust balance system of the present invention.

A strain measuring device 98 for sensing changes in axial thrust, is attached to flange portion 78 of thrust bearing housing 76. As shown schematically in FIG. 2, a signal 100 from device 98 travels to signal amplifier 102 and controller 104. Controller 104 controls the pressure of hydraulic fluid from hydraulic pressure source 106 to supply passage 44. Strain measuring devices, amplifiers, and controllers are well known. Numerous means for arranging such a feedback network will be obvious to a person of ordinary skill in the art.

Means for automatically varying the pressure of the hydraulic fluid proportionally to changes in axial thrust can consist of an electro-mechanical system such as described above with reference to FIG. 2. Alternatively, a completely mechanical system may be employed wherein pressurized gas is tapped from any convenient pressure area of the engine and used to control hydraulic fluid pressure. For example, compressor discharge gas may be used. This gas pressure is then used as a rough measure of rotor thrust by appropriate conversion factors. Although the electro-mechanical system described above is a preferred form, the pure mechanical system may find application, for example, on non-variable cycle engines.

In operation, engine shaft rotor 12 is subject to a net axial pressure force or thrust due to static and/or dynamic pressure forces on the various components of the rotor. This net axial thrust is transmitted through rotor 12 and thrust bearing assembly 84 to bearing housing 76 and engine frame member 34. The magnitude of this thrust may be monitored by an appropriately placed strain measuring device 98. The signal from this device is detected, amplified and transmitted to a controller 104 which automatically regulates the pressure of hydraulic fluid, preferably engine lubricating oil, delivered to feed tube 74.

Hydraulic fluid passes from feed tube 74 through supply duct 44 and into annular pressure chamber 46. Since the hydraulic fluid pressure is substantially uniform throughout pressure chamber 46 and since chamber 46 is coaxial with the axis of rotor 12 there is no net radial force exerted therein. In contrast, there is an axial force applied to rotor 12 in the aft direction. It will be clear, however, that pressure chamber 46 could be positioned in a like manner aft of rotor 12 in which case the force exerted by hydraulic fluid on such rotor would be in a forward direction. It will also be clear that cooperating pressure chambers might be employed on opposing sides of the rotor for balancing both forward or aft axial thrusts on thrust bearing 84.

In the present application the forward positioned chamber 46 is preferred since a net aft axial thrust on the thrust bearing is not anticipated. This is due in part to the compressor discharge region being forward bounded by the rotor assembly and aft bounded by nonrotating support members. Consequently, the high pressure in this region exerts only forward axial thrust on the rotor. Reduction in compressor discharge seal diameter increases the rotor area subject to compressor discharge pressure and thereby increases the forward axial thrust on the rotor. Since the highest pressure in a gas turbine engine is at compressor discharge, reduction in seal diameter virtually assures a net forward axial thrust. Thrust balance is achieved by positioning pressure chamber 46 forward of rotor 12. The need for positioning a pressure chamber aft of rotor 12 is thereby obviated.

The invention as herein described provides means for both balancing axial thrust on the rotor thrust bearing as well as reducing compressor discharge seal diameter. A significant benefit accrues as a consequence of such seal diameter reduction. The flowpath seal for preventing compressor discharge pressure leakage is essentially ring-shaped so that the seal area exposed to leakage is proportional to the circumference and hence diameter of the seal. By reducing the diameter, leakage across the seals is reduced in proportion to the diameter reduction. For example, with a given clearance, reduction of compressor discharge seal diameter from 16 to 9 inches reduces leakage rate by about 44%, resulting in increased horsepower for the engine. It should be noted that similar seal diameter reductions are possible for any other seals critical to thrust balance.

It will be clear to those skilled in the art that the present invention is not limited to the specific embodiment described and illustrated herein. Numerous substitutions and modifications can be undertaken without departing from the invention as defined by the spirit and scope of the claims.

Accordingly, the invention being thus described, what is desired to be secured by Letters Patent of the United States is as follows.

What is claimed is:

1. In a gas turbine engine, including a rotor supported axially by at least one rotor thrust bearing, compensating means for automatically compensating for changes in axial thrust in said rotor thrust bearing, comprising:
    (a) a sealed pressure chamber with an inner surface defined by a portion of said rotor, a non-rotating member, and sealing means operatively connecting said rotor and said non-rotating member, said sealing means positioned so as to define a radially outer and inner seal for said sealed pressure chamber;
    (b) means for supplying hydraulic fluid to said chamber;
    (c) means for sensing changes in axial thrust on said rotor; and
    (d) means for varying the pressure of said hydraulic fluid proportionally to said changes in axial thrust.

2. Compensating means, as recited in claim 1, wherein said pressure chamber is substantially annular shaped and said sealing means comprise radially inner and radially outer coaxially disposed ring-shaped seal assemblies.

3. Compensating means, as recited in claim 2, wherein said means for supplying hydraulic fluid to said chamber comprises a supply duct connecting a source of hydraulic fluid to said chamber through an opening in said non-rotating member.

4. Compensating means, as recited in claim 1, wherein said pressure chamber is located axially forward of said rotor; whereby force is exerted by said hydraulic fluid in an aft direction.

5. In a gas turbine engine, including a rotor supported axially by at least one rotor thrust bearing, means for reducing the axial thrust on said bearing, comprising:
    (a) an annular, sealed pressure chamber coaxial with the center axis of said rotor wherein said chamber is bounded by a portion of said rotor, a non-rotating member, and sealing means operatively connecting said rotor and non-rotating member, said sealing means positioned as to define a radially outer and inner seal for said sealed pressure chamber; and
    (b) means for supplying hydraulic fluid to said chamber at a pressure proportional to said axial thrust on said thrust bearing.

* * * * *